United States Patent [19]

Pousette

[11] Patent Number: 4,830,072
[45] Date of Patent: May 16, 1989

[54] AIR SEAL FOR ROTARY LOG DEBARKER

[75] Inventor: Ronald D. Pousette, Vancouver, Canada

[73] Assignee: Brunette Machine Works, Ltd., New Westminster, Canada

[21] Appl. No.: 227,969

[22] Filed: Aug. 2, 1988

[51] Int. Cl.$^4$ .................................................. B27L 1/00
[52] U.S. Cl. ................................. 144/208 E; 92/106; 92/110; 144/208 R
[58] Field of Search .......................... 92/63, 106, 110; 144/208 R, 208 E

[56] References Cited

U.S. PATENT DOCUMENTS

| | | | |
|---|---|---|---|
| 2,945,706 | 7/1960 | Franked | 144/208 E |
| 3,053,294 | 9/1962 | Andersson | 144/208 E |
| 3,137,329 | 6/1964 | Smith | 144/208 E |
| 4,402,353 | 9/1983 | Pousette | 144/208 E |

Primary Examiner—W. Donald Bray
Attorney, Agent, or Firm—Kolisch, Hartwell & Dickinson

[57] ABSTRACT

The debarking machine of the instant invention includes a frame having a stationary central hub, a ring rotatably mounted on the frame for rotation about the hub having air-pressure-actuated tools carried on the ring. Power means are provided for rotating the ring. Air passage means extend from the central hub to the ring for supply actuating air to the tools. Air passage means includes a rotary-air-seal coupling, which comprises a substantially U-shaped channel formed of a pair of opposed L-shaped annular structures which extend about the hub and have a first air plenum carried therein. A pair of annular, floating seals are disposed on the interior side walls of the U-shaped channel and a rotary disc, having a second air plenum therein, is mounted on the ring and received in the U-shaped channel, in rotatable contact with the air seals.

11 Claims, 3 Drawing Sheets

AIR SEAL FOR ROTARY LOG DEBARKER

BACKGROUND AND SUMMARY OF THE INVENTION

The instant invention relates to air seals, and specifically to air seals for rotary log debarking machines.

Log debarking machines are used in the forest product industry to remove bark from logs prior to the logs being further processed. A the typical log debarking machine includes a frame which has an air-tool-carrying ring rotatably mounted thereon. The tools are operable to scrape the bark off of the log as the log is carried along a log-transport axis through the machine. Such an operation produces a great deal of debris from the removed bark. The internal workings of the debarking machine must be protected from the debris. Additionally, means must be provided for providing an air supply to the tools located on the rotating ring. This is usually accomplished by means of a rotating air plenum which is carried on the ring and a stationary air plenum which is carried on a frame. The two air plenums are in contact with each other and provide the necessary means for conducting an air supply from the frame to the tools mounted on the ring. One such seal is disclosed in my prior issued U.S. Pat. No. 4,402,353, LOG DEBARKER WITH AIR SEAL COOLING FINS.

The conventional log debarking machine is arranged such that the frame provides an external, stationary mount with the ring rotating internally of the frame, and the log-transport axis extending through the ring. This configuration results in debris accumulating in the interior of the ring, where it is held by centrifugal force. Eventually, the debris builds up and may interfere with free passage of a log through the machine, or, the debris may work its way into the internal mechanism of the machine.

The normal arrangement of the air seal in log debarking machines includes a U-shaped channel having a seal-bearing face on either interior side thereof, and an annular ring disposed in the channel, having grooves disposed on either side thereof, with the air seal carried in the groove. Because the U-shaped channel is generally formed of two separate pieces, which allow the removal of one side of the channel during machine assembly and disassembly, the bearing face of the channel may flex, particularly as heat builds up in the system, resulting in an incomplete seal and loss of efficiency of transport of air between the stationary and rotary portions of the machine.

In the usual debarking machine, the air seal is maintained in contact with the moving bearing surface by means of a pre-compressed O-ring which is carried in the groove with the air seal. After a period of time, the O-ring looses resiliently and is unable to force the seal against the bearing surface. Simultaneously, the seal wears and is unable to maintain an air-tight condition. The net result is a loss of air pressure to the tools carried on the rotating portion of the machine.

The debarking machine of the instant invention includes a frame having a stationary central hub, and a ring rotatably mounted on the frame for rotation about the hub having air-pressure-actuated tools carried on the ring. Power means are provided for rotating the ring. Air passage means extend from the central hub to the ring for supplying actuating air to the tools. Air passage means includes a rotary-air-seal coupling, which comprises a substantially U-shaped channel formed of a pair of opposed L-shaped annular structures which extend about the hub and have a first air plenum carried therein. A pair of annular, floating seals are disposed on the interior side walls of the U-shaped channel and a rotary disc, having a second air plenum therein, is mounted on the ring and received in the U-shaped channel, in rotatable contact with the air seals.

An object of the instant invention is to provide a log debarking machine having a non-rotating central hub.

Another object of the instant invention is to provide a log debarking machine which includes an air passage means therein which provides for easy removal and replacement of a tool carrying ring of the machine.

A further object of the instant invention is to provide a log debarking machine having a rotary-air-seal coupling wherein a wear surface is carried on a single member thereof.

Yet another object of the instant invention is to provide a debarking machine having a rotary-air-seal coupling wherein the air seals are urged against a bearing surface by means of air pressure in the coupling.

These and other objects of the instant invention will become more fully apparent as the description which follows is read in conjunction with the drawings.

DETAILED DESCRIPTION OF THE PREFERRED EMBODIMENT

Figure 1:
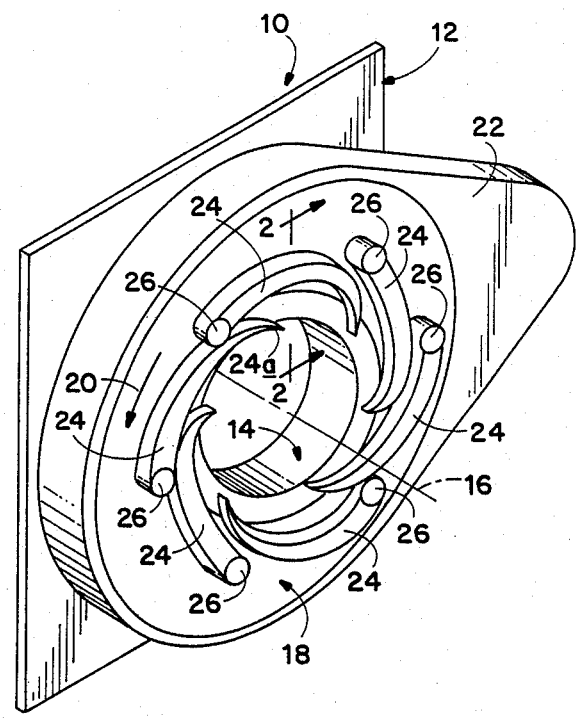
FIG. 1 is a simplified perspective view of a portion of the log debarker incorporating the air seal of the instant invention.

Turning now to the drawings, and initially to FIG. 1, a simplified rendition of a debarker machine 10 is depicted. Machine 10 includes a stationary frame 12, which includes a stationary central hub 14 having a log-transport axis 16 extending therethrough.

A ring 18 is mounted on frame 12 for rotation about axis 16 in the direction indicated by arrow 20.

A shroud 22 extends about ring 18 and may enclosed power means, or a portion of power means, which are operable to rotate ring 18.

Debarking arms, such as debarking arms 24 are carried on ring 18 in such a manner as to allow swinging of the inner, free, ends 24a thereof toward and away from axis 16. Arms 24, also referred to herein as air-pressure-actuated tools, are operable, when brought in contact with a log carried along axis 16, as ring 18 is rotated, to remove the bark from the log. Each arm is carried on a bell-crank shaft 26 which is connected to an air cylinder carried on the ring.

Figure 2:
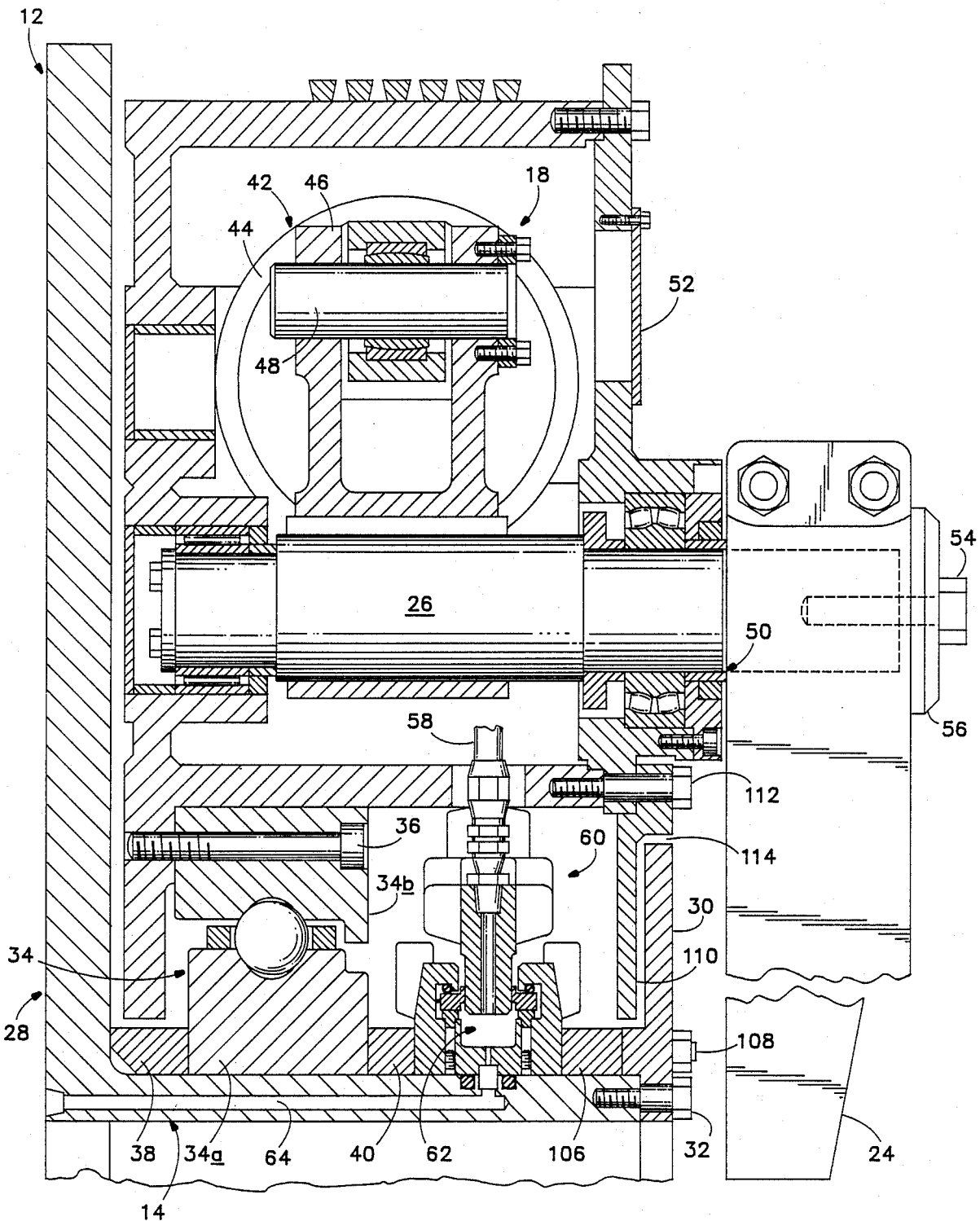
FIG. 2 is a greatly enlarged sectional view taken generally along line 2—2 in FIG. 1, which line is contained within a plane extending through the axis of rotation of the ring of the debarker.

Referring now to FIG. 2, the internal construction of machine 10 is depicted. Frame 12 includes a stator housing 28 which includes central hub 14. A stator cover plate 30 is secured to housing 28 by bolts 32, one of which is depicted in FIG. 2. In the preferred embodiment, bolts 32 are spaced about the periphery of hub 14 at approximately 15° intervals. Ring 18 is rotatably mounted on frame 12 by means of a ring bearing 34 which includes a first portion 34a secured to stator housing 28 and a second portion 34b secured to ring 18 by multiple screws 36. Bearing 34 is positioned on stator housing 28 by means of bearing spacers 38, 40.

Ring 18 has mounted thereon plural air cylinder assemblies 42. Assembly 42 includes an air cylinder, shown somewhat schematically at 44, which is connected to a bell crank 46 by means of a pin 48. Bell crank 46 is connected to bell crank shaft 26, which is mounted on ring 18 by means of a bearing and seal assembly, shown generally at 50. Access to cylinder assembly 42 may be gained by removal of cover plate 52. Arm 24 is secured to bell crank shaft 26 by means of bolt 54 and retaining plate 56.

The air supply for cylinder 44 passes through a flexible hose 58 which is connected to a rotary-air-seal coupling, shown generally at 60.

Coupling 60 includes a first air plenum, shown generally at 62 which is in communication with an air duct 64, which is in turn connected to an air supply (not shown). First air plenum 62 includes a pair of L-shaped channel halves 66, 68, each of which are annular structures and which are secured to stator housing 28. Ports 69 are formed by the union of channel halves 66, 68 about the periphery of air plenum 62. Ports 69 communicate with air duct 64 to provide an air supply to plenum 62. Channel halves 66 and 68 are removably fixed on stator housing 28. Passages 70 are formed in the channel halves during fabrication thereof, to provide a seat for plugs 72, which will be described later herein. Passages 70 are sealed with set screws 74. A seal is maintained between housing 28 and the channel halves by O-rings 75. Cooling fins 66a, 68a, are located on halves 66, 68, respectively.

Figure 3:
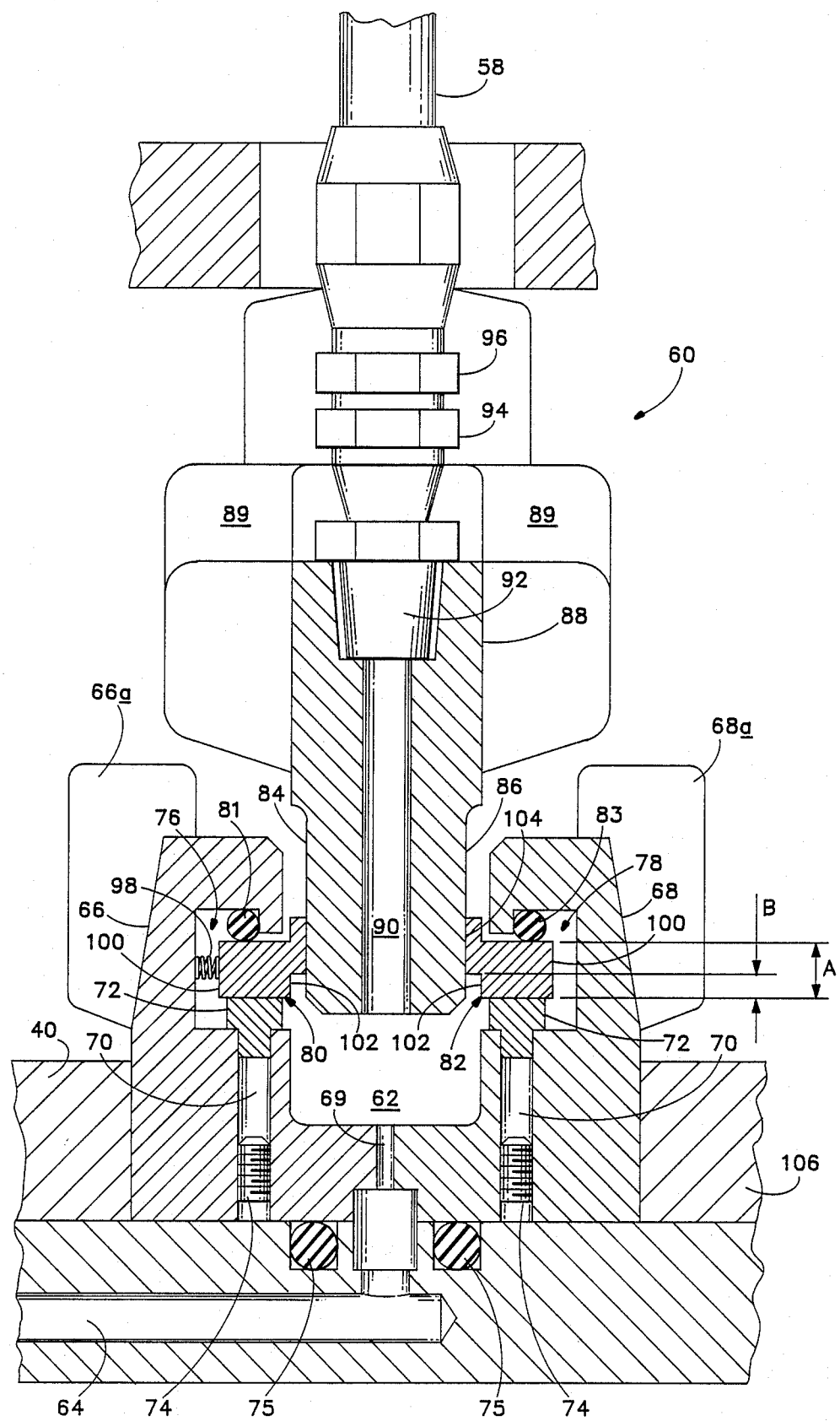
FIG. 3 is a further enlarged view of the air seal of the invention.

Referring now to FIG. 3, each channel half has a groove 76, 78, respectively, formed therein. The grooves have spaced apart sides 76a, 76b and 78a, 78b, and bases 76c, 78c, respectively. The grooves are annular, extending about the interior side walls of channel halves 66, 68, and receive a floating, annular air seal 80, 82, respectively, therein.

The annular air seals are retained in the grooves and are allowed limited travel therein. The seals ride on the upper surface of plugs 72, which are spaced about grooves 76, 78. The seals contact a seal-bearing surface 84, 86 which is located on either side of a rotary disc 88, which comprises another portion of the rotary-air-seal coupling. Disc 88 includes a second air plenum 90 therein which is in communication with fittings 92, located at intervals about the periphery of disc 88. Each fitting 92 is attached to a connector 94 which in turn is attached to a second connector 96 located on the end of flexible hose 58. Cooling fins 89 are located on disc 88.

Resilient means are provided to urge the air seals against seal-bearing suraces on disc 88. One form of such urging takes the form of spring means 98 means which is located between the base of groove 76 and seal 80.

Another form of resilient means is provided through the use of differential air pressure. This is illustrated in connection with seal 82. Seal 82 has a rear face 100 having a height defined by A. A front face 102 has a height B which is less than that of height A. A sealing face 104 is in contact with seal-bearing surface 86 and forms an air-tight seal therebetween. O-ring 83 forms a seal between groove 78 and seal 82. The air in first air plenum 62 is free to enter groove 78 about the majority of the periphery thereof. (In FIGS. 2 and 3, plug 72 is depicted and would appear to block the area of groove 78 from communicating with plenum 62, however, it should be remembered that plug 72 occupied only a very small space and the majority of the area between seal 82 and groove side 78a is vacant).

The air in first plenum 62 is therefore able to contact both front face 102 and rear face 100 of seal 82. Because rear face 100 has a larger surface area than front face 102, air pressure acting equally on the faces will result in a net force which urges seal 82 toward disc 88, thereby maintaining sealing face 104 in tight contact with seal-bearing surface 86.

Regardless of which form of resilient means are provided, the floating air seal of the invention is maintained in close contact with bearing surface 86. The two forms of resilient means may be combined on a single seal. The force with which the air seal is pushed against the bearing surface is not dependent upon the resiliency of O-rings 81 or 83, which serve merely to maintain an air-tight seal between the air seals and first air plenum 62. As the sealing face of the air seals wears, the seals project further out of grooves 76, 78 and maintain an air-tight seal with bearing surface 86.

Thus an air passage connecting frame 12 to air cylinders 44 is defined by air duct 64, port 69, the interior of first air plenum 62, the interior of second air plenum 90 and the passage extending through the interior of fitting 92, connectors 94, 96 and hose 58.

To complete the description of the machine, an air-distributor spacer 106 is provided to assist in properly maintaining channel halves 66 and 68 in their proper position. A set screw 108 extends through stator cover plate 30 in order to maintain pressure on the channel halves, spacers and ring bearing.

A cover plate 110 extends downward from ring 18 behind stator cover plate 30 to assist in restricting the intake of debris into the area which includes coupling 60. Plate 110 is held in place by bolts 112 which are distributed about the periphery of the plate.

As with any piece of machinery, the machine of the instant invention occasionally needs to be dismantled for preventive maintenance and servicing. In particular, ring 18 and its associated components must occasionally be removed to service the air cylinders, the arms and other components thereof. Removal of the arm-bearing ring has, in the case of known machines, proved to be a rather complicated, time consuming procedure. However, the machine of the instant invention, and particularly the construction of the rotary-air-seal coupling, are such as to make removal of the ring relatively simple.

Removal of the ring first requires that arms 24 be swung to a position where cover plate 110 and stator cover plate 30 are fairly accessible. If the arms are not so swingable, the arms must be removed from the bell-crank shafts.

Once the arms are out of the way, set screws 108 may be loosened, and bolts 32 removed, thereby allowing removal of stator cover plate 30. Next, bolts 112 may be removed, thereby allowing removal of cover plate 110. Connectors 94 and 96 may be disconnected, thereby allowing detachment of hose 58 from, the second air plenum. Spacer 106 and channel half 68 may then be removed, allowing free access to disc 88. If necessary, the disc may be disconnected from ring 18 for servicing, which also allows access to bearing 34 and removal of ring 18 from frame 12.

The positioning of a gap 114 between stator cover plate 30 and cover plate 110 is such that the angular velocity of debris moving by gap 114 is of sufficient magnitude to resist being drawn into the gap and thereby into the interior of the machine.

Thus, a debarking machine has been disclosed which incorporates a floating air seal in a rotary-air-seal coupling and which has a stationary central hub which will not hold debris thereagainst by means of centrifugal force.

Although a preferred embodiment of the invention has been disclosed herein, it should be appreciated that variations and modifications may be made thereto without departing from the scope of the invention.

It is claimed and desired to secure as Letters Patent:

1. In a log debarking machine including:
   a frame having a central hub;
   a ring rotatably mounted on said frame for rotation relative thereto;
   air-pressure-actuated tools carried on said ring; and
   power means for rotating said ring, an improved air seal comprising:
   air passage means extending between said frame and said ring, said passage means including a rotary-air-sealcoupling, said coupling including a first air plenum having a floating air seal thereon and a second air plenum in communication with said first air plenum bearing on said air seal.

2. The machine of claim 1 wherein said first air plenum includes opposed, annular, seal-receiving grooves thereabout and said air seals are disposed in said grooves, said grooves having spaced apart sides and a base extending between said sides.

3. The machine of claim 2 wherein said floating air seals include resilient means for holding said seals against said second air plenum.

4. The machine of claim 3 wherein said resilient means includes spring biasing means located between said groove and said seal for maintaining said seal in an air sealing contact with said second plenum.

5. The machine of claim 3 wherein said resilient means includes a rear face on said seal, located adjacent said base of said groove and a front face on said seal, located adjacent said second air plenum, wherein said rear face and said front face are in communication with the air in said first plenum and wherein said rear face has a relatively larger surface area than said front face, the air pressure in said first plenum thereby urging said seal toward said second plenum.

6. The machine of claim 3 wherein said first plenum includes a U-shaped channel with said grooves disposed on the interior side walls thereof, and said second plenum is located on said frame, said second plenum having a seal-bearing surface on either side thereof, said air seals being positioned to form an air-tight seal between said channel and said seal-bearing surface.

7. The machine of claim 6 wherein said U-shaped channel comprises a first L-shaped channel half and a second L-shaped channel half, said channel halves being removably fixed to said frame.

8. A log debarking machine comprising:
   a frame having a stationary central hub;
   a ring rotatably mounted on said frame for rotation about said hub;
   air-pressure-actuated tools carried on said ring;
   power means for rotating said rings; and
   air passage means extending from said central hub to said ring for supplying actuating air to said tools, and including a rotary-air-seal coupling, said coupling comprising a substantially U-shaped channel including a pair of opposed L-shaped annular structure, extending about said hub having a first air plenum in said U-shaped channel, a pair of annular seals disposed on the interior side walls of said U-shaped channel, and a rotary disc, having a second air plenum therein, mounted on said ring, and received in said U-shaped channel, in rotatable contact with said seals, said second plenum being in communication with said first plenum.

9. The machine of claim 1 wherein said disc includes a seal-bearing surface on either side thereof and wherein said seals are spring biased toward said seal-bearing surface.

10. The machine of claim 8 wherein said annular seal includes a rear face, located adjacent a side wall on said first air plenum, and a front face, located adjacent said second air plenum, wherein said rear face and said front face are in communication with the air in said first plenum and wherein said rear face has a relatively larger surface area than said front face, the air pressure in said first plenum thereby urging said seals toward said second plenum.

11. A log debarking machine comprising:
    a frame having a stationary central hub;
    a ring rotatably mounted on said frame for rotation about said hub;
    air-pressure-actuated tools carried on said ring;
    power means for rotating said ring; and
    air passage means extending from said central hub to said ring for supplying actuating air to said tools, and including a rotary-air-seal coupling, said coupling comprising a substantially U-shaped channel including a pair of opposed L-shaped annular structures, extending about said hub having a first air plenum in said U-shaped channel, said channel, having on the interior side walls thereof, an annular seal-receiving groove, each groove having spaced apart sides and a base extending between said sides, a pair of annular seals disposed in said grooves, each seal having a rear face, located adjacent said base of said groove and a front face, wherein said rear face has a relatively larger surface area than said front face, said groove being constructed and arranged to allow communication between said front and said rear face and the air in said first plenum, and which further includes a rotary disc, having a second air plenum therein, mounted on said ring, and received in said U-shaped channel, in rotatable contact with said seals, said second plenum being in communication with said first plenum, and wherein the air pressure in said first plenum urges said seal toward said second plenum.

* * * * *